United States Patent
Nunes et al.

(10) Patent No.: US 11,994,114 B2
(45) Date of Patent: May 28, 2024

(54) NACELLE WITH PRE-TENSIONED BRACE CABLES

(71) Applicant: Vestas Wind Systems A/S, Aarhus (DK)

(72) Inventors: Joël Saraiva Nunes, Åbyhøj (DK); Jose Fernandes Oliveira, Viana do Castelo (PT); Fernando Jorge Dias Da Costa Bastos, Oporto (PT); Nuno Alexandre Novo Medeiros Da Silva, Aveiro (PT)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 17/913,475

(22) PCT Filed: Feb. 24, 2021

(86) PCT No.: PCT/DK2021/050051
§ 371 (c)(1),
(2) Date: Sep. 22, 2022

(87) PCT Pub. No.: WO2021/204333
PCT Pub. Date: Oct. 14, 2021

(65) Prior Publication Data
US 2023/0140690 A1 May 4, 2023

(30) Foreign Application Priority Data
Apr. 7, 2020 (DK) .......................... PA 2020 70215

(51) Int. Cl.
*F03D 80/80* (2016.01)
(52) U.S. Cl.
CPC ........ *F03D 80/88* (2016.05); *F05B 2240/912* (2013.01)
(58) Field of Classification Search
CPC .... F03D 80/88; F03D 80/00; F05B 2240/912; F05B 2240/14; Y02E 10/72; Y02E 10/728
See application file for complete search history.

(56) References Cited

U.S. PATENT DOCUMENTS

| | | | |
|---|---|---|---|
| 8,881,471 B1 * | 11/2014 | Theobald | E04H 12/20 52/148 |
| 2011/0076140 A1 * | 3/2011 | Elsenheimer | F03D 13/10 415/200 |

(Continued)

FOREIGN PATENT DOCUMENTS

| | | | |
|---|---|---|---|
| DE | 202017106870 U1 * | 3/2019 | |
| EP | 3372823 A1 | 9/2018 | |

(Continued)

OTHER PUBLICATIONS

Danish Patent and Trademark Office Search and Examination Report in PA 2020 70215, dated Oct. 19, 2020.

(Continued)

*Primary Examiner* — Juan G Flores
*Assistant Examiner* — Eric A Lange
(74) *Attorney, Agent, or Firm* — Wood Herron & Evans LLP

(57) ABSTRACT

A nacelle for a wind turbine is disclosed. The nacelle comprises a self-carrying rear structure (1) extending in a length direction (4) between a front end (6) defining an interface towards a hub mounted rotatably on the nacelle, and a rear end (7) arranged opposite to the front end (6), the nacelle defining an interface (15) towards a tower (14) of the wind turbine. The nacelle further comprises at least one pre-tensioned brace cable (8, 9) attached to the rear structure (1) at a first position (10) at or near the interface (15) towards the tower (14) along the length direction (4), at a second position (11) at or near the rear end (7) of the rear structure (1), and at at least one intermediate position (12) between the first position (10) and the second position (11) along the length direction (4). A direction defined by the pre-tensioned brace cable (8, 9) is changed at each intermediate position (12).

14 Claims, 6 Drawing Sheets

(56) References Cited

U.S. PATENT DOCUMENTS

| | | | | |
|---|---|---|---|---|
| 2011/0101699 A1* | 5/2011 | Segovia | ............... | F03D 15/10 |
| | | | | 290/55 |
| 2011/0204649 A1 | 8/2011 | Segovia et al. | | |
| 2011/0278852 A1* | 11/2011 | Hjort | ............... | F03D 80/00 |
| | | | | 290/55 |
| 2019/0178232 A1 | 6/2019 | Thomsen et al. | | |

FOREIGN PATENT DOCUMENTS

| | | |
|---|---|---|
| EP | 3475561 A1 | 5/2019 |
| EP | 3475565 A1 | 5/2019 |
| EP | 3712421 A1 | 9/2020 |
| WO | 2010069315 A2 | 6/2010 |
| WO | 2018001428 A1 | 1/2018 |

OTHER PUBLICATIONS

European Patent Office, International Search Report and Written Opinion in PCT Application No. PCT/DK2021/050051, dated May 12, 2021.

\* cited by examiner

NACELLE WITH PRE-TENSIONED BRACE CABLES

FIELD OF THE INVENTION

The present invention relates to a nacelle for a wind turbine, the nacelle comprising a rear structure. The nacelle of the invention can be constructed in a modular manner, while ensuring proper handling of loads.

BACKGROUND OF THE INVENTION

Wind turbines normally comprise a nacelle arranged on top of a tower structure. The nacelle carries a rotor with one or more wind turbine blades, and various components, such as gear arrangement, generator, etc., which are normally housed inside the nacelle.

Nacelles often comprise a main frame, a rear frame structure and a nacelle cover. The rear frame structure may be self-carrying, and it is often the part of the nacelle which handles loads, whereas the cover is normally not load bearing. It is therefore necessary to ensure that the rear frame structure is designed to handle expected loads on the nacelle. Accordingly, once the design of the rear frame structure, e.g. in terms of dimensions, choice of material, design of components, etc., has been selected, it may not be allowed to change the design. This may have the consequence that a given manufacturer may only provide a few standard nacelle designs, and that it is therefore not possible to customize the nacelle for specific sites or purposes.

DESCRIPTION OF THE INVENTION

It is an object of embodiments of the invention to provide a nacelle for a wind turbine in which the design of the nacelle can be customized without compromising the capability of the nacelle to handle loads.

It is a further object of embodiments of the invention to provide a nacelle for a wind turbine in which the nacelle can be constructed in a modular manner.

It is an even further object of embodiments of the invention to provide a nacelle for a wind turbine in which loads can be handled in a cost-effective manner.

According to a first aspect, the invention provides a nacelle for a wind turbine, the nacelle comprising a self-carrying rear structure extending in a length direction between a front end defining an interface towards a hub mounted rotatably on the nacelle, and a rear end arranged opposite to the front end, the nacelle further defining an interface towards a tower of the wind turbine, wherein the nacelle further comprises at least one pre-tensioned brace cable attached to the rear structure at a first position at or near the interface towards the tower along the length direction, at a second position at or near the rear end of the rear structure, and at at least one intermediate position between the first position and the second position along the length direction, where a direction defined by the pre-tensioned brace cable is changed at each intermediate position.

Thus, the invention provides a nacelle for a wind turbine. As described above, the nacelle is a part of a wind turbine which carries the rotor with the wind turbine blades, and which may accommodate various components, such as main shaft, gearbox, generator, etc.

The nacelle of the invention comprises a self-carrying rear structure. In the present context the term 'self-carrying' should be interpreted to mean that the rear structure is capable of carrying its own weight and maintain its size and shape without the aid of any further components or structures.

The rear structure extends in a length direction between a front end and a rear end. The front end defines an interface towards a hub mounted rotatably on the nacelle. Thus, the front end is the part of the nacelle which carries the hub, and thereby the wind turbine blades. In the case that the wind turbine is an upwind wind turbine, the front end is thereby the part of the nacelle which faces the incoming wind.

The rear end is arranged opposite to the front end. Thus, in the case that the wind turbine is an upwind wind turbine, the rear end is the part of the nacelle which is furthest away from the incoming wind.

Accordingly, the length direction of the nacelle may be arranged substantially along a direction defined by a main shaft of the wind turbine, e.g. substantially perpendicularly to a direction defined by the tower of the wind turbine.

The nacelle further defines an interface towards a tower of the wind turbine. The interface may comprise a yaw system which allows the nacelle to perform yawing movements relative to the tower, in order to orientate the wind turbine blades correctly relative to the wind direction. Loads on the nacelle normally need to be transferred to the tower. Therefore, a major load path passes from the nacelle to the tower, via this interface.

The nacelle further comprises at least one pre-tensioned brace cable attached to the rear structure. More particularly, the brace cable is attached to the rear structure at a first position, at a second position, and at at least one intermediate position.

The first position is arranged at or near the interface towards the tower, along the length of the rear structure. Accordingly, the first position is arranged at or near the major load path along which loads are passed between the nacelle and the tower, when seen along the length direction of the nacelle. For instance, the first position may be at or immediately next to the interface towards the tower. However, it is not ruled out that the first position is displaced from the interface towards the tower along a direction being perpendicular to the length direction, as long as it is at or near the interface along the length direction. For instance, the interface towards the tower may be arranged at a bottom part of the nacelle, whereas the first position may be arranged at a top part of the nacelle above the interface towards the tower.

The second position is arranged at or near the rear end of the rear structure. This is the part of the nacelle which is expected to give rise to the highest loads originating from movements of the nacelle along sideways or up and down directions. Thus, the brace cable interconnects a region of the nacelle which gives rise to high loads and a region of the nacelle in which loads are transferred from the nacelle to the tower. Accordingly, loads may travel through the brace cable instead of, or in addition to, through the rear structure.

Each intermediate position is arranged between the first position and the second position, along the length direction of the nacelle. Accordingly, the brace cable interconnects the first position and the second position, via the one or more intermediate positions. A direction defined by the pre-tensioned brace cable is changed at each intermediate position. Thereby the brace cable is allowed to closely follow a load path of the nacelle.

Accordingly, the at least one pre-tensioned brace cable strengthens the rear structure of the nacelle in the sense that it improves its ability to handle loads. Furthermore, this is obtained in a cost-effective manner, because applying a brace cable to the rear structure is significantly less costly than designing the rear structure directly with the required strength. Finally, this allows the nacelle to be constructed in a customized manner from standard components or modules, because the required strength can be provided to any given part of the nacelle by providing it with a brace cable which is connected to the rear structure at appropriate first, second and intermediate positions.

Pre-tensioning the cables also enables the components to put constraints on the buckling length of parts under compressions. For instance, in a cross, the pre-tensioned brace cables will 'brace' the elements under compressions in terms of buckling constraint, thereby reducing the buckling risk.

It should be noted that, even though only one pre-tensioned brace cable is specifically described, for the sake of clarity, the nacelle may very well be provided with two or more pre-tensioned brace cables. For instance, brace cables may be arranged symmetrically on the nacelle, in order to avoid uneven forces.

Since the rear structure is self-supported, it may be transported to an installation site in an assembled state, and the brace cable(s) may be mounted at the site.

The self-carrying rear structure may define a length along the length direction, and a width extending substantially perpendicularly to the length direction, wherein the length is at least twice as long as the width. According to this embodiment, the size of the rear structure is significantly larger along the length direction than along directions perpendicularly thereto, notably along the width direction. Accordingly, the nacelle is of a kind which is relatively long. For long nacelles, the rear end may be arranged at a significant distance from the tower, and thereby from the region where the nacelle is supported by the tower. In such nacelles, movements of the rear end, e.g. sideways or along an up/down direction, have a significant impact on the loads introduced in the nacelle. Thereby, strengthening the nacelle by means of at least one brace cable is therefore particularly advantageous in the case of long nacelles.

The first position and/or the second position may be arranged at or near a bottom part of the rear structure. For instance, the first position as well as the second position may be arranged at or near the bottom part of the rear structure. In this case at least one of the intermediate positions may be arranged at or near a top part of the rear structure and/or at least one of the intermediate positions may be arranged between the bottom part and the top part. Thereby the path followed by the brace cable extends across various vertical levels, even though the first position and the second position are arranged at substantially the same vertical level.

As an alternative, the first position may be arranged at or near the bottom part of the rear structure, while the second position is arranged at another level, e.g. at or near the top part of the rear structure. Or the second position may be arranged at or near the bottom part of the rear structure, while the first position is arranged at another level, e.g. at or near the top part of the rear structure. Thereby the path followed by the brace cable also extends across various vertical levels.

It is particularly advantageous if at least the first position is arranged at or near the bottom part of the rear structure, because thereby the brace cable is attached to the rear structure near the position where loads are transferred from the nacelle to the tower.

At least one intermediate position may be arranged at or near a top part of the rear structure. If at least one of the first position and the second position is arranged at or near the bottom part of the rear structure, and at least one of the intermediate positions is arranged at or near the top part of the rear structure, then the path followed by the brace cable extends across the entire height of the rear structure. This allows the rear structure to handle loads efficiently, in particular loads originating from vertical movements of the nacelle.

Each brace cable may substantially follow a load path in the rear structure. According to this embodiment, the loads will naturally travel at least partly through the brace cable, and thereby the loads are appropriately handled, even though the rear structure of the nacelle is not, per se, capable of handling the loads. In other words, the brace cable is provided exactly where it is required in order to strengthen the rear structure and enhance its capability to handle expected loads on the nacelle.

The rear structure may be a frame structure comprising a plurality of elongated rigid members being connected to each other at connecting regions. According to this embodiment, the rear structure is constructed from a plurality of standard elements, in the form of rigid members, such as beams, rods, truss members or the like. The rigid members are connected to each other at connecting regions, e.g. via joints or similar components. The frame structure may, e.g., be a lattice structure or a truss structure, and the connecting regions may be regarded as nodes of the frame structure.

Since the rear structure, according to this embodiment, is constructed from standard elements, it is easy to customize the nacelle, e.g. in terms of dimensions of the nacelle. If the standard elements are not capable of handling expected loads on the customized nacelle on their own, brace cables are applied at suitable positions, thereby strengthening the rear structure of the nacelle to the extent that expected loads can be handled.

The first position, the second position and/or the intermediate positions may be arranged at connecting regions of the frame structure. The connecting regions of the frame structure are positions where load paths may be expected to meet.

Furthermore, in the case that the elongated rigid members are connected to each other by means of joints or similar components, such joints may be stronger than the elongated rigid members. It is therefore an advantage that the points where the brace cable is attached to the rear structure, and force transfer between the rear structure and the brace cable may therefore take place, are positioned at such joints. Loads paths may be expected to change direction at the connecting regions where the elongated rigid members are connected to each other. It is therefore an advantage that the intermediate positions, where the brace cable changes direction, are arranged at the connecting regions, because thereby it can easily be ensured that the path followed by the brace cable follows a load path of the rear structure.

Furthermore, the intermediate positions should preferably be arranged as close as possible to centres of the connecting regions, in order to attach the brace cable to the rear structure as close as possible to such centres, and thereby avoid offset forces to the greatest possible extent. This would also allow the brace cable to closely follow a load path of the rear structure.

At least one of the brace cable(s) may extend along at least one of the elongated rigid members. According to this embodiment, at least part of the path followed by the brace cable coincides with at least one of the elongated rigid members, e.g. between two connecting regions. In the case that this elongated rigid member forms part of a load path of the rear structure of the nacelle, this load path is thereby reinforced by means of the brace cable.

For instance, the elongated rigid member may comprise at least two elongated sub-parts extending substantially in parallel to each other, and the brace cable may be arranged between the elongated sub-parts. According to this embodiment, the brace cable is arranged close to the centre of the elongated rigid member, and thereby close to a load path coinciding with the elongated rigid member.

For instance, the elongated sub-parts may be in the form of C-shaped or U-shaped profiles arranged adjacent to each other with their open ends pointing away from each other, and the brace cable may be arranged between the profiles.

Alternatively or additionally, at least part of the path followed by the brace cable may not be coinciding with any of the elongated rigid members. For instance, at least one brace cable may extend diagonally with respect to the nacelle. Such brace cables are suitable for handling sideways movements of the nacelle.

At least one of the brace cable(s) may be provided with an adjustable pre-tension mechanism providing pre-tension to the brace cable.

According to this embodiment, the pre-tension applied to the brace cable is not fixed, but can be adjusted in accordance with the prevailing circumstances. For instance, when the brace cable is mounted on the rear structure, the brace cable may be tightened by means of the adjustable pre-tension mechanism, thereby applying a pre-tension to the brace cable which is suitable for the configuration of the nacelle and for the expected operating conditions. This is an easy way of ensuring that an accurate pre-tension is applied to the brace cable. Furthermore, the pre-tension may be adjusted or fine tuned after installation, e.g. during operation of the wind turbine.

The pre-tension mechanism may comprise a hydraulic actuator. According to this embodiment, the pre-tension in the brace cable is adjusted by operating the hydraulic actuator. Alternatively or additionally, the pre-tension mechanism may comprise other kinds of actuators, such as electrical actuators, magnetic actuators, etc. One advantage of magnetic actuators is that they react fast, and thereby magnetic actuators are particularly suitable for handling fast changes in the prevailing circumstances which need to be reacted to by adjusting the pre-tension in the brace cable.

The pre-tension mechanism may be dynamically controllable, based on sensor measurements performed on the nacelle. According to this embodiment, the pre-tension in the brace cable is controlled dynamically, e.g. continuously, during operation of the wind turbine, based on measured and actual conditions affecting the nacelle. For instance, changes in wind direction, wind speed, turbulence conditions, wind shear, etc. may cause changes in the loads and forces acting on the nacelle. Furthermore, such dynamic control may be applied for controlling dynamic amplification and/or possible resonances. Such changes in loads and forces may be detected by means of accelerometers, deflection sensors, or the like, mounted on the nacelle, or on other parts of the wind turbine, such as the wind turbine blades or an upper part of the tower. For instance, movements of the rear end of the nacelle in a sideways and/or an up and down direction may be monitored, and the pre-tension in the brace cables may be adjusted in order to counteract such movements. This allows even large variations in load level on the nacelle to be mitigated in an easy manner, and without having to 'over-dimension' the design of the nacelle, in terms of capability to handle loads. Furthermore, the changes in loads and forces can be handled in real time, or almost real time.

The control of the pre-tension mechanism in response to sensor measurements may, e.g., be based on an algorithm providing a correspondence between a given sensor measurement and a load or force impact on the nacelle. The algorithm may, e.g., be based on machine learning.

Alternatively or additionally, the outcome from the sensor measurements may be used to improve the static and the dynamic response of the nacelle structure.

According to a second aspect, the invention provides a wind turbine comprising a tower and a nacelle according to the first aspect mounted on the tower. The remarks set forth above with reference to the first aspect of the invention are equally applicable here.

BRIEF DESCRIPTION OF THE DRAWINGS

The invention will now be described in further detail with reference to the accompanying drawings in which.

DETAILED DESCRIPTION OF THE DRAWINGS

Figure 1:
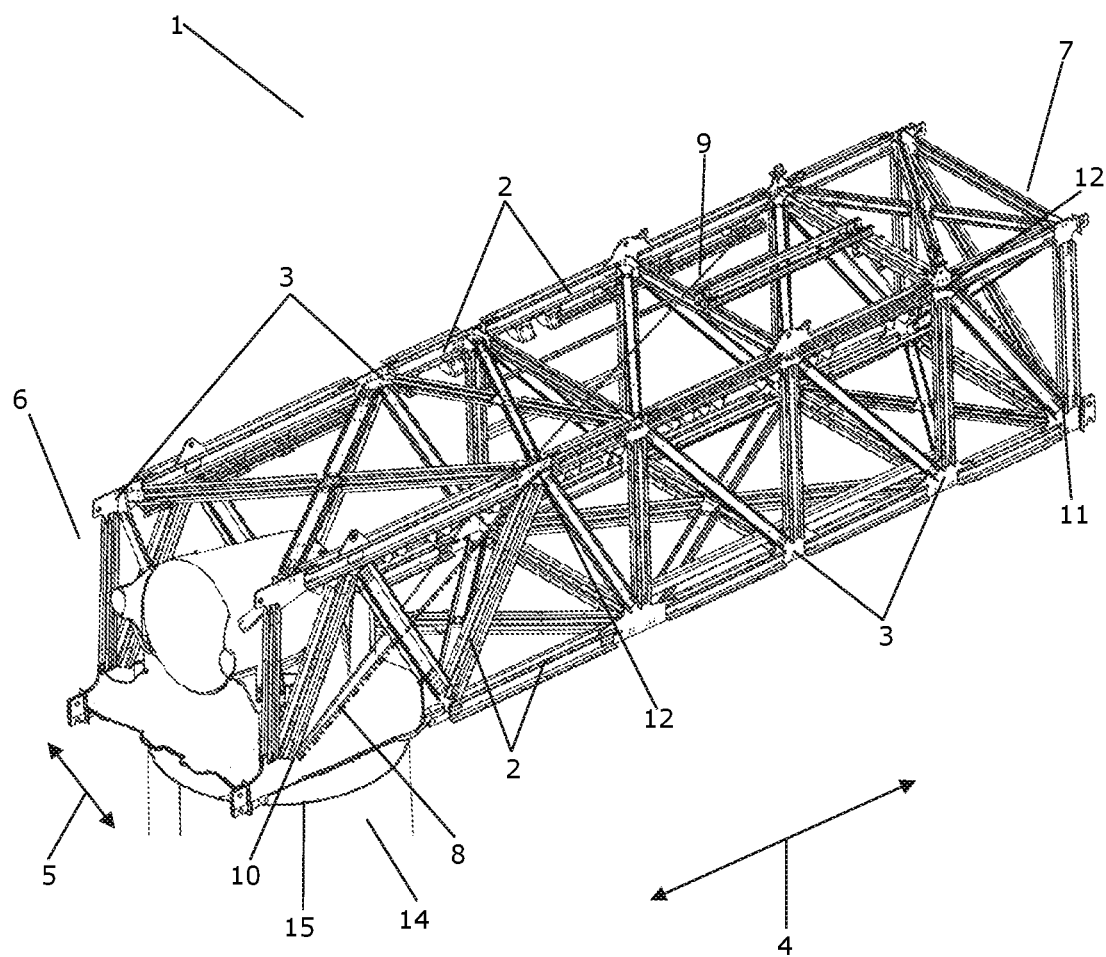
FIG. 1 is a perspective view of a rear structure for a nacelle according to a first embodiment of the invention, illustrating a first brace cable.

FIG. 1 is a perspective view of a self-carrying rear structure 1 for a nacelle according to a first embodiment of the invention. The rear structure 1 is in the form of a frame structure comprising a plurality of elongated rigid member 2 connected to each other at connecting regions 3. The connecting regions 3 thereby form nodes of the frame structure. The elongated rigid members are made from elongated sub-parts in the form of C-shaped or U-shaped beams extending in parallel.

The rear structure 1 defines a length direction, illustrated by arrow 4, and a width direction, illustrated by arrow 5. In the length direction 4, the rear structure 1 extends from a front end 6 to a rear end 7. A hub, carrying one or more wind turbine blades, can be connected to the rear structure 1 at the front end. The rear structure 1 is further connected to a wind turbine tower 14 via an interface 15 arranged at a bottom part of the rear structure 1 at a position near the front end 6.

A first brace cable 8 and a second brace cable 9 are mounted on the rear structure 1. The second brace cable 9 will be described below with reference to FIGS. 3 and 4.

The first brace cable 8 is attached to the rear structure 1 at a first position 10, at a second position 11, and at two intermediate positions 12. The first position 10 is arranged at the bottom part of the rear structure 1, near the front end 6 of the rear structure 1, and near the interface 15 towards the tower 14. The second position 11 is arranged at the bottom part of the rear structure 1, and at the rear end 7 of the rear structure 1. Both of the intermediate positions 12 are arranged at the top part of the rear structure 1, at positions between the front end 6 and the rear end 7, and thereby between the first position 10 and the second position 11, along the length direction 4. Thereby the first brace cable 8 changes direction at each of the intermediate positions 12. The intermediate positions 12 are further arranged at connecting regions 3, and as close to a centre of the connecting region 3 as possible.

The first position 10, the second position 11 and the intermediate positions 12 are all arranged at the same side part of the rear structure 1. Thereby the path followed by the first brace cable 8 from the first position 10 to the second position 11 runs along this side part. Furthermore, the path runs from a position at the bottom part of the rear structure 1, to the top part of the rear structure 1, and back to the bottom part of the rear structure 1.

Between the intermediate positions 12, the first brace cable 8 extends along three of the elongated members 2. At this part of the path, the first brace cable 8 is positioned between the two sub-parts forming the respective elongated members 2.

Thus, the first brace cable 8 interconnects a position at the rear end 7 of the rear structure 1, i.e. the second position 11, and a position near the interface 15 towards the tower 14, i.e. the first position 10, along a side part of the rear structure 1. Thereby the first brace cable 8 is capable of transferring loads and forces from the rear end 7 of the rear structure 1 to the interface 15 towards the tower 14. The first brace cable 8 is particularly suitable for transferring loads and forces originating from movements of the rear end 7 of the rear structure 1 along an up and down direction.

Figure 2:
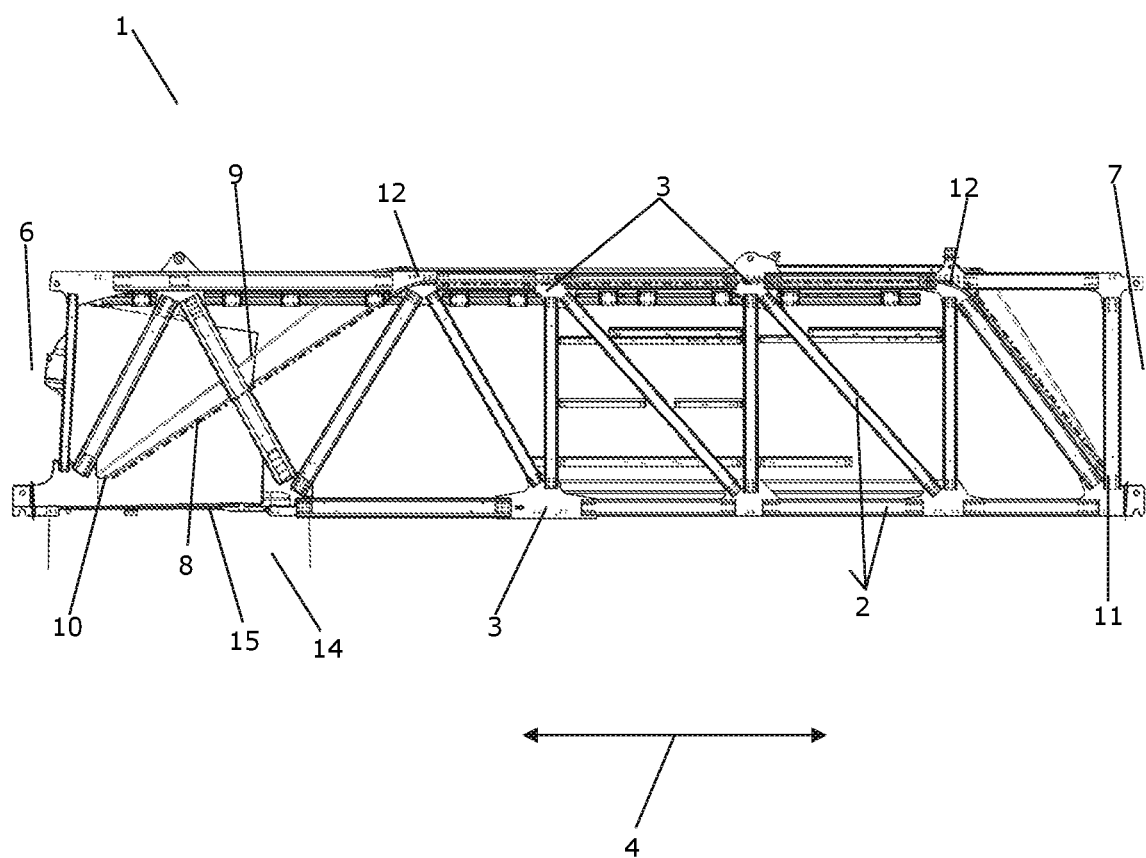
FIG. 2 is a side view of the rear structure of FIG. 1.

FIG. 2 is a side view of the rear structure 1 of FIG. 1. It can be seen that the first brace cable 8 extends along the side part of the rear structure 1.

Figure 3:
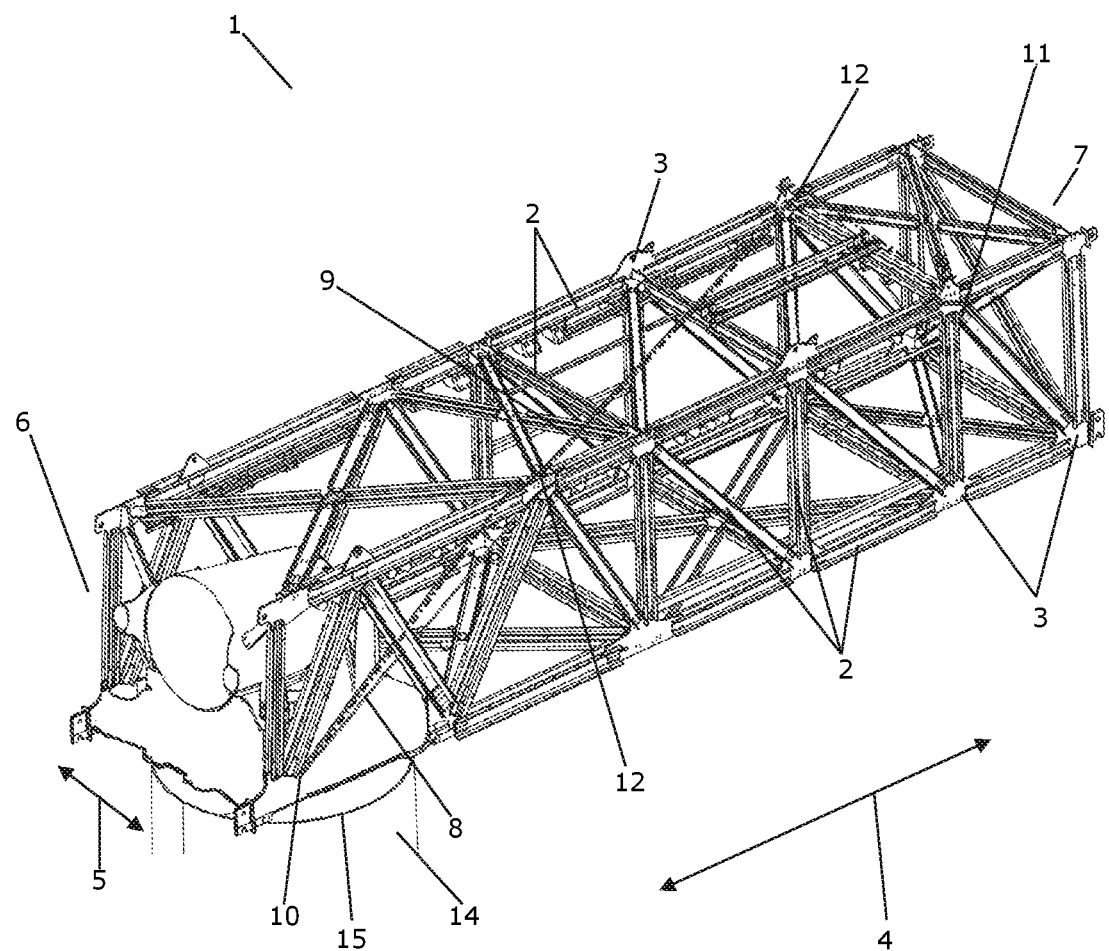
FIG. 3 is a perspective view of the rear structure of FIG. 1, illustrating a second brace cable.

FIG. 3 is a perspective view of the rear structure 1 of FIG. 1, but with emphasis on the second brace cable 9. Similarly to the first brace cable 8, the second brace cable 9 is attached to the rear structure 1 at a first position 10, at a second position 11, and at two intermediate positions 12. The first position 10 is arranged at the bottom part of the rear structure 1, near the front end 6 of the rear structure 1, and near the interface 15 towards the tower 14. The second position 11 is arranged at the bottom part of the rear structure 1, and at the rear end 7 of the rear structure 1. Both of the intermediate positions 12 are arranged at the top part of the rear structure 1, at positions between the front end 6 and the rear end 7, and thereby between the first position 10 and the second position 11, along the length direction 4. Thereby the second brace cable 9 also changes direction at each of the intermediate positions 12. The intermediate positions 12 are further arranged at connecting regions 3, and as close to a centre of the connecting region 3 as possible.

The first position 10 and the second position 11 are arranged at opposing side parts of the rear structure 1. Furthermore, the intermediate positions 12 are also arranged at opposing side parts. Thereby the path followed by the second brace cable 9 from the first position 10 to the second position 11 runs diagonally and interconnects the two side parts of the rear structure 1. More particularly, the path runs diagonally between the two intermediate positions 12. Furthermore, the path runs from a position at the bottom part of the rear structure 1, to the top part of the rear structure 1, and back to the bottom part of the rear structure 1.

Thus, the second brace cable 9 interconnects a position at the rear end 7 of the rear structure 1, i.e. the second position 11, and a position near the interface 15 towards the tower 14, i.e. the first position 10, in a diagonal manner. Thereby the second brace cable 9 is capable of transferring loads and forces from the rear end 7 of the rear structure 1 to the interface 15 towards the tower 14. Due to the diagonal run of the second brace cable 9, the second brace cable 9 is particularly suitable for transferring loads and forces originating from sideways movements of the rear end 7 of the rear structure 1.

Figure 4:
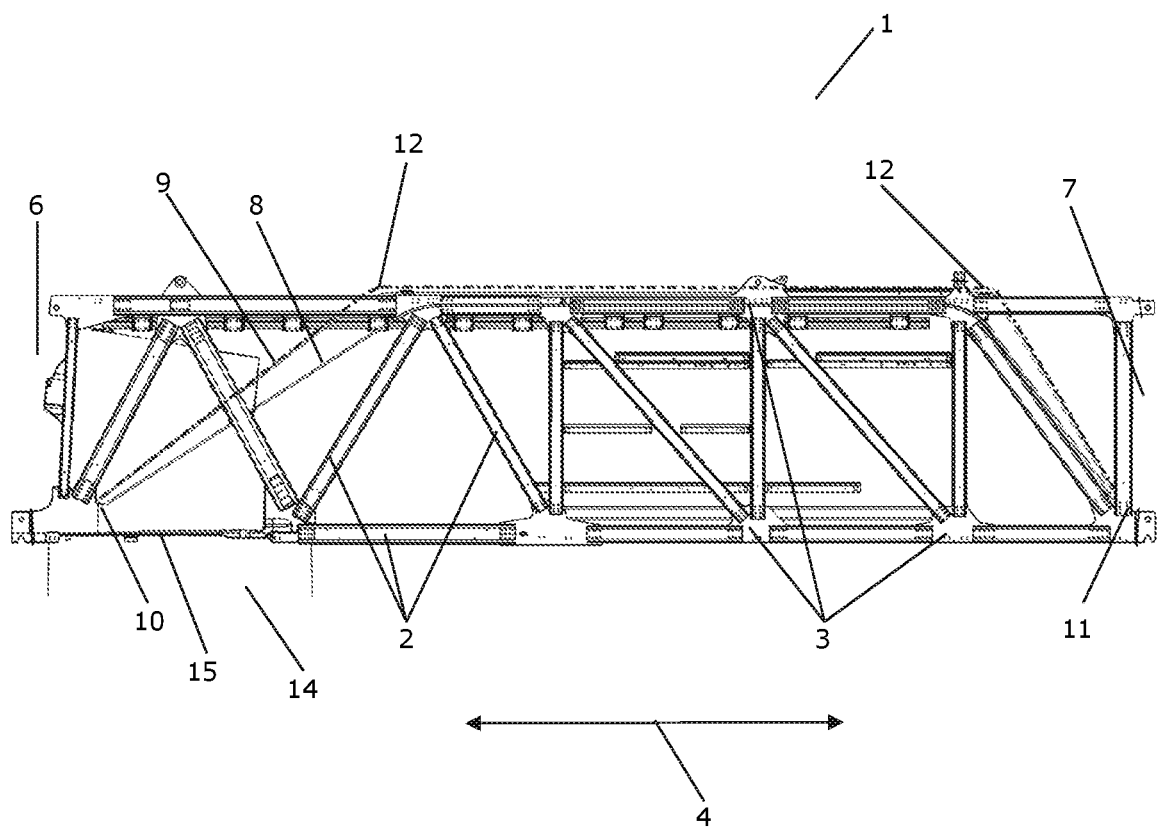
FIG. 4 is a side view of the rear structure of FIG. 3.

FIG. 4 is a side view of the rear structure 1 of FIG. 4. It can be seen that the second brace cable 9 extends diagonally relative to the rear structure 1.

Figure 5:
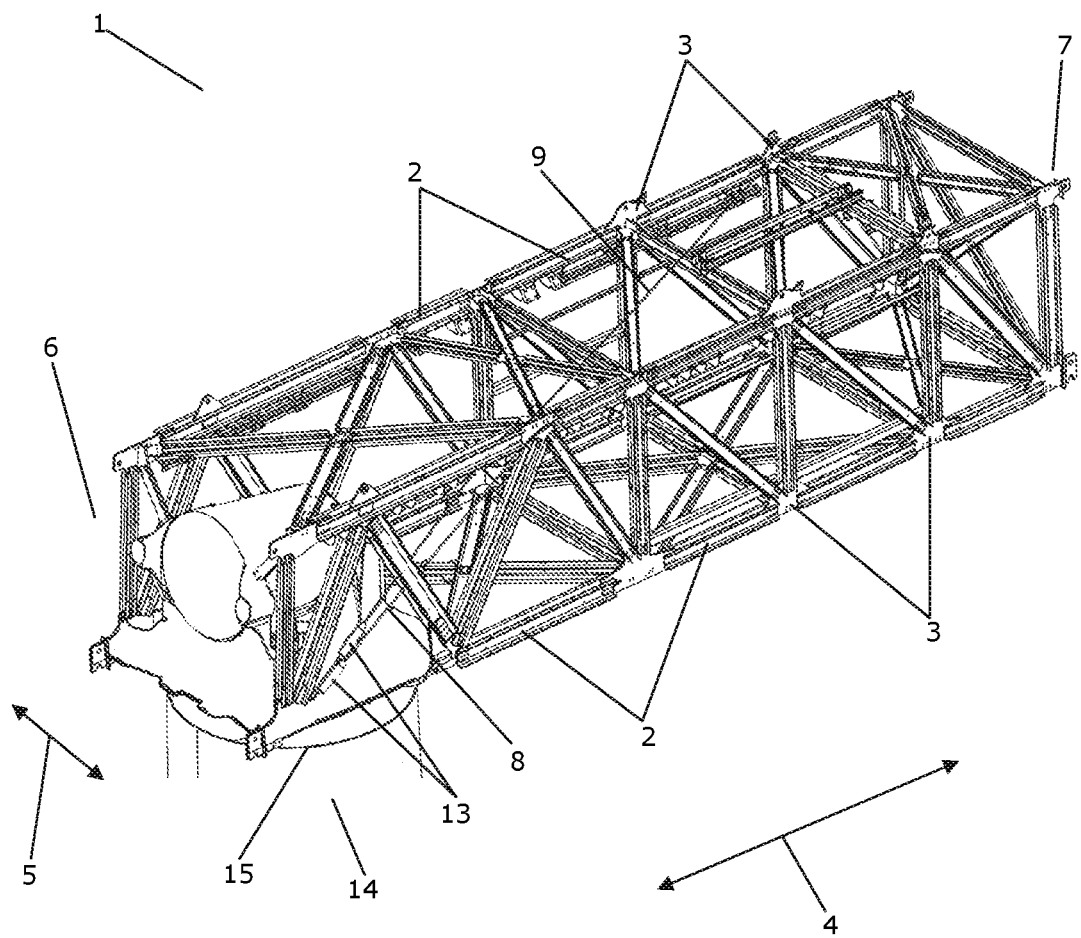
FIG. 5 is a perspective view of the rear structure for a nacelle according to a second embodiment of the invention, illustrating an adjustable pre-tension mechanism.

FIG. 5 is a perspective view of a self-carrying rear structure 1 for a nacelle according to a second embodiment of the invention. The nacelle of FIG. 5 is very similar to the nacelle of FIGS. 1-4, and it will therefore not be described in detail here. In the nacelle of FIG. 5, the brace cables 8, 9 are provided with adjustable pre-tension mechanisms 13 in the form of hydraulic cylinders. Accordingly, pre-tension is applied to the brace cables 8, 9 by operating the pre-tension mechanisms 13. Thereby it is ensured that each of the brace cables 8, 9 is pre-tensioned to a level which is exactly appropriate under the given circumstances.

The adjustable pre-tension mechanisms 13 may, e.g., be operated dynamically in the sense that the pre-tension of the brace cables 8, 9 is adjusted during operation of the wind turbine, based on sensor measurements performed on the nacelle and/or on other parts of the wind turbine. Thereby loads and forces acting on the nacelle may be counteracted in real time or almost in real time.

Figure 6:
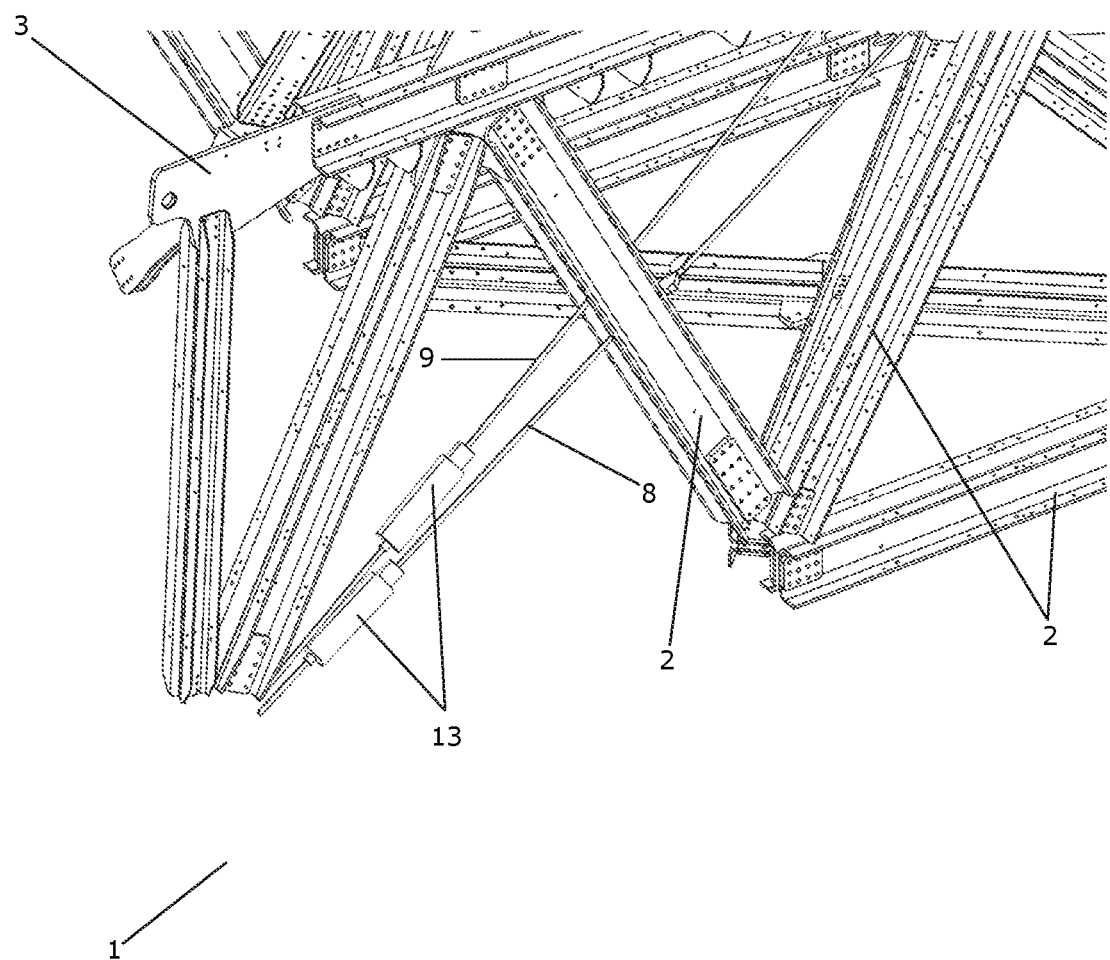
FIG. 6 is a detailed view of the adjustable pre-tension mechanism illustrated in FIG. 5.

FIG. 6 is a detailed view of the adjustable pre-tension mechanisms 13 of FIG. 5. It can further be seen that the elongated members 2 comprise two sub-parts in the form of C-shaped or U-shaped beams extending in parallel.

The invention claimed is:

1. A nacelle for a wind turbine, the nacelle comprising a self-carrying rear structure extending in a length direction between a front end defining an interface towards a hub mounted rotatably on the nacelle, and a rear end arranged opposite to the front end, the nacelle further defining an interface towards a tower of the wind turbine, wherein the nacelle further comprises at least one pre-tensioned brace cable located within the nacelle, the at least one pre-tensioned brace cable attached to the rear structure at a first position at or adjacent to the interface towards the tower along the length direction, at a second position at or adjacent to the rear end of the rear structure, and at at least one intermediate position between the first position and the second position along the length direction, where a direction defined by the pre-tensioned brace cable is changed at each intermediate position.

2. The nacelle according to claim 1, wherein the self-carrying rear structure defines a length along the length direction, and a width extending substantially perpendicularly to the length direction, wherein the length is at least twice as long as the width.

3. The nacelle according to claim 1, wherein the first position and/or the second position is/are arranged at or adjacent to a bottom part of the rear structure.

4. The nacelle according to claim 1, wherein the at least one intermediate position is arranged at or adjacent to a top part of the rear structure.

5. The nacelle according to claim 1, wherein each brace cable substantially follows a load path in the rear structure.

6. The nacelle according to claim 1, wherein the rear structure is a frame structure comprising a plurality of elongated rigid members being connected to each other at connecting regions.

7. The nacelle according to claim 6, wherein the first position, the second position and/or the at least one intermediate position is/are arranged at connecting regions of the frame structure.

8. The nacelle according to claim 6, wherein the at least one of pre-tensioned brace cable extends along at least one of the plurality of elongated rigid members.

9. The nacelle according to claim 8, wherein at least one of the plurality of elongated rigid members comprises at least two elongated sub-parts extending substantially in parallel to each other, and wherein the brace cable is arranged between the elongated sub-parts.

10. The nacelle according to claim 1, wherein the at least one of pre-tensioned brace cable is provided with an adjustable pre-tension mechanism providing pre-tension to the at least one pre-tensioned brace cable.

11. The nacelle according to claim 10, wherein the pre-tension mechanism comprises a hydraulic actuator.

12. The nacelle according to claim 10, wherein the pre-tension mechanism is dynamically controllable, based on sensor measurements performed on the nacelle.

13. A wind turbine comprising a tower and a nacelle according to claim 1 mounted on the tower.

14. A nacelle for a wind turbine, the nacelle comprising a self-carrying rear structure extending in a length direction between a front end defining an interface towards a hub mounted rotatably on the nacelle, and a rear end arranged opposite to the front end, the nacelle further defining an interface towards a tower of the wind turbine, wherein the nacelle further comprises at least one pre-tensioned brace cable attached to the rear structure at a first position at or adjacent to the interface towards the tower along the length direction, at a second position at or adjacent to the rear end of the rear structure, and at at least one intermediate position between the first position and the second position along the length direction, where a direction defined by the pre-tensioned brace cable is changed at each intermediate position, wherein the first position and/or the second position is/are arranged at or adjacent to a bottom part of the rear structure.

* * * * *